Figure 3:
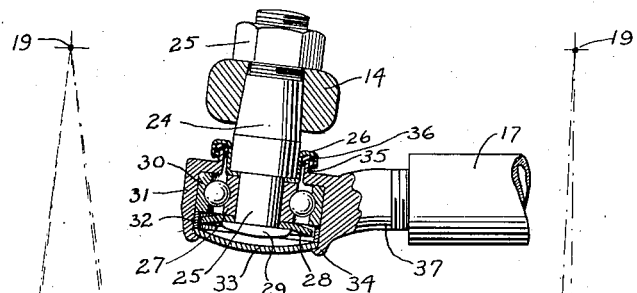

Aug. 12, 1941.    P. HEFTLER    2,251,936
STEERING LINKAGE
Filed Aug. 6, 1936    2 Sheets-Sheet 1

Inventor
Paul Heftler

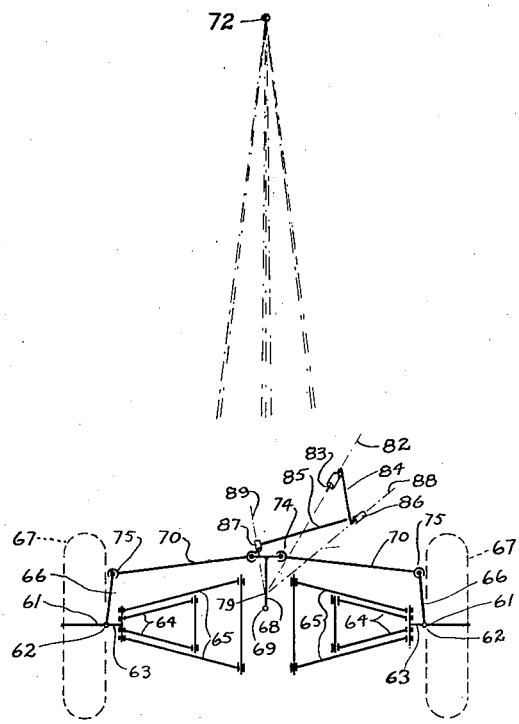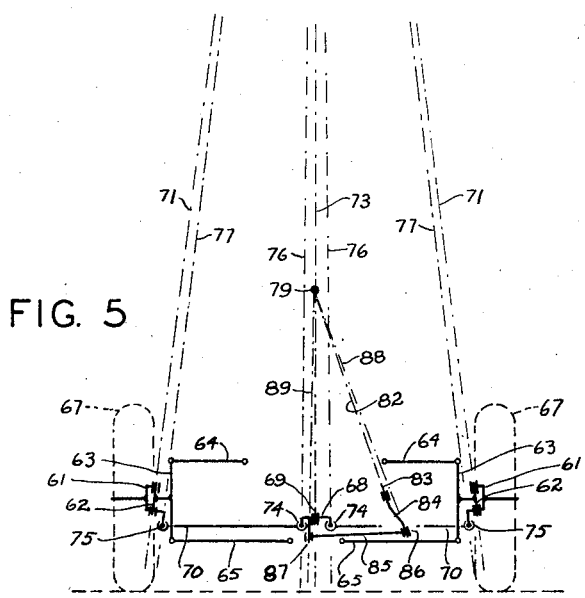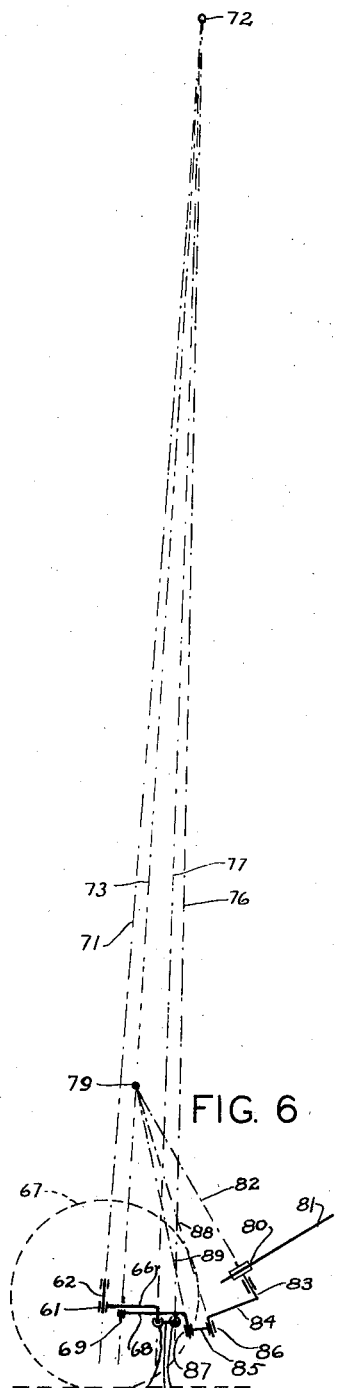

Patented Aug. 12, 1941

2,251,936

UNITED STATES PATENT OFFICE 2,251,936

STEERING LINKAGE

Paul Heftler, Chicago, Ill.

Application August 6, 1936, Serial No. 94,563

13 Claims. (Cl. 280—96.2)

This invention relates to steering linkages for automobiles and similar vehicles, and its principal object is to provide a way to reduce the movement in some of the joints in steering linkages to rotation about the principal axis of the joints and to make it possible to use simple pin-type joints in place of the ball and socket joints now used. In cases where it is not possible to reduce the movement in the joint to pure rotation about a single axis, it is the object of this invention to provide a way to lessen the amount of movement about any other axis than the principal axis of the joint and to make it possible, in some cases, to use a cheaper joint or to seal the joint better.

In automobiles as they are made today, there are generally four or more ball and socket joints or their equivalents in the steering linkage. In cars having an axle, the steering knuckles are provided with steering arms connected together by a tie-rod. Since the axes of the king pins are inclined at an angle of fourteen or fifteen degrees to each other, it has been thought necessary to use universal or ball and socket joints between the tie-rod and the steering arms. If the axes of joints at the ends of the tie-rod are placed as taught by this invention, they need not be ball and socket joints. The same is true of the Dubonnet type of "knee action" in which the "knees" are mounted on pivots or king-pins carried by the frame and are connected together by a tie-rod extending between the ends of steering arms fixed to the knees.

In automobiles having an independent front suspension in which the steering knuckles and the steering knuckle supports can move up and down with respect to the frame, as in the familiar double wishbone type of suspension, there is generally provided a member pivoted on the frame and connected by short transverse track-rods to the steering arms on steering knuckles. This central member or steering arm is generally connected to the pitman arm of the steering gear by a drag link or other member provided with ball and socket joints at its ends. In the Dubonnet type of suspension, the drag link is connected to the pitman arm and to a steering arm on one of the steering knuckles. This invention shows how, in both of these types of suspensions, the steering gear may be placed in the car so that it is unnecessary to use ball and socket joints on the ends of the drag link.

Figure 4:
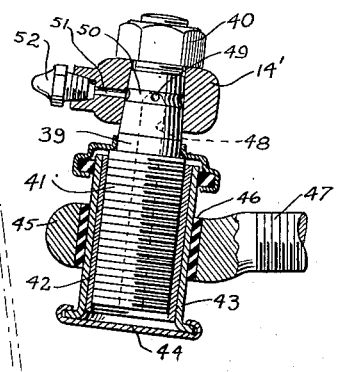
Figure 1:
Figure 1:
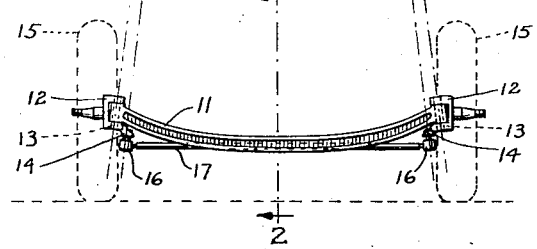
Figure 2:
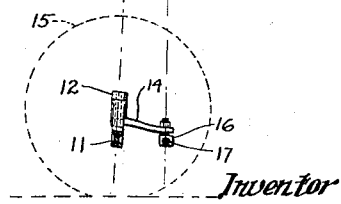

Two embodiments of the invention are shown in the drawings, in which:

Figures 1 and 2 are a front view and a cross-section of a front axle having a steering linkage designed in accordance with the invention;

Figures 3 and 4 are cross-sections of two forms of joint suitable for use in the steering linkage shown in Figures 1 and 2; and Figures 5, 6, and 7 are a diagrammatic front view, a diagrammatic side view, and a diagrammatic plan view of a "double-wishbone" type independent suspension having a steering linkage designed in accordance with the invention.

The steering linkage illustrated in Figures 1 and 2 is applied to a conventional axle 11 having, at each end, a steering knuckle 12 pivoted on a king-pin 13 in the conventional manner. Each steering knuckle 12 is provided with a steering arm 14 extending alongside of the wheel 15 carried by the steering knuckle and arranged to carry a tie-rod joint 16 at its end. The two tie-rod joints 16, one on each of the two steering arms 14, are joined by an ordinary tie-rod 17.

As in practically all modern front axles, the king-pins 13 (shown in dotted lines) are at an angle of a few degrees to the vertical, as seen from the front, the upper ends of the king-pins being closer together than their lower ends. Because of this and the fact that they lie in a single plane, the axes 18 of the king-pins intersect at a point 19, which is fifteen or twenty feet or more above the center of the axle and which is called the apex of the linkage.

In the ordinary steering linkage, the tie-rod joints are ball-and-socket joints, and they are secured to the steering arms with their axes parallel to each other. The invention consists in inclining the tie-rod joints to each other and to the transverse plane of the king-pins so that their axes 21 pass through the same single point 19 as the axes 18 of the king-pins. The four axes 18, 18, 21 and 21 thus all pass through a single point, the apex 19, like the four edges of a four-sided pyramid, or four lines on the surface of a cone and the linkage thus formed is known as a pyramidal or conical linkage.

When the axes 21 of the king-pins are arranged as described above, the tie-rod joints 16 do not have to be ball-and-socket joints, contrary to what everyone has believed until now. They can be simple pin joints or pin-type joints, and by the term "pin-type joint" is meant a joint which allows the two parts which it connects to move with respect to each other only about a single axis. Some of the advantages of pin-type joints are that they are cheaper than ball-and-socket joints of equal quality and that it is easier to design them so that grease will stay in them and dirt will stay out of them.

One form of pin-type joint which may be used in the pyramidal steering linkage described above is shown in Figure 3. This joint has a stud 24 whose upper end is tapered and threaded in the conventional manner to enable it to be secured by a nut 25 in a tapered hole in the end of the steering arm 14. The lower end of the stud 24 is formed into a neck 25 which carries a part 26 of a grease seal, the inner race 27 of a deep groove ball bearing, and a safety ring 28, all of these being held in place by the riveted over end 29 of the stud. The outside diameter of the safety ring 28 is larger than the inside diameter of the outer race 30 of the ball bearing in order that the joint will not come apart even though the balls of the bearing should be destroyed in some manner or other.

The outer race 30 of the ball bearing is mounted in the shell 31 of the joint and is held in place by a spacing ring 32 and the bottom plate 33 of the joint, the edge of the bottom plate 33 in turn being held by the turned-over edge 34 of the socket. The top of the socket 31 is formed into an annular wall 35 which fits up into a groove in a synthetic rubber or cork ring 36 carried by the sealing member 26, completing the sealing of the joint.

The shell or body 31 of the joint is forged integrally with a threaded stud or shank 37, which screws into the end of the tubular tie rod 17 in the conventional manner. If the shank 37 were perpendicular to the axis of the joint, which is the same as the axis of the stud 24 of the joint, the axes of two joints connected by the tie rod would be parallel and would not intersect as required to form the pyramidal linkage. The shank 37 is therefore placed at an acute angle to the axis of the joint, the exact angle depending, of course, upon the geometry of the particular linkage with which it is to be used.

Another form of joint that can be used in the pyramidal steering linkage is shown in Figure 4. This joint has a stud 39 whose upper end is tapered and threaded in the conventional manner to enable it to be secured by a nut 40 in a tapered hole in the end of the steering arm 14'. The lower part 41 of the stud is threaded and fits into a threaded bushing 42, the stud and the bushing being made of a pair of metals, like steel and bronze, which form good bearing surfaces.

The threaded bushing 42 is carried in a socket 43 formed of a piece of tubing with a flanged lower edge and having a bottom 44 whose edges are turned over and clamped down on the flanged edge of the tube 43. The socket 43 is encircled around its middle by a yoke 45 which, instead of clamping the socket 43 tightly, has a ring of rubber 46 interposed between and bonded to itself and the surface of the socket. The yoke 45 has a shank 47, which is threaded so as to fit into the end of a conventional tie rod in the same way as the shank 37 of the joint shown in Figure 3.

One manner of applying the invention to a conventional "double wishbone" type of independent suspension is illustrated in Figures 5 to 7. In this suspension, the steering knuckles 61 are pivoted on king-pins 62 which are fixed to upright king-pin supports 63, and each king-pin support has its upper and lower ends connected to the frame of the vehicle (omitted from the drawings for the sake of simplicity) by upper and lower wishbone links 64 and 65. Each steering knuckle 61 has a steering arm 66 fixed to it and extending back alongside of the wheel 67 carried by the steering knuckle.

A central steering arm 68 is carried on an upright pivot 69 fixed to the frame and is connected by two track rods 70 to the two outer steering arms 66 so that all three steering arms will swing together.

The king-pins 62 are inclined like those on the axle shown in Figures 1 and 2 and described above, and their axes 71 intersect at a point 72 located high above the center line of the vehicle and called the apex of the track rod linkage. The invention, as applied to this portion of the steering linkage, consists in aligning the pivot 69 of the center steering arm on the frame so that its axis 73 passes through the apex 72 of the track rod linkage and in also aligning the joints 74 and 75 at the inner and outer ends of the track rods 70 so that the axes 76 and 77 of these joints also pass through the apex 72 of the track rod linkage.

The above described alignment of the king-pins, center steering arm pivot, and track rod joints does not make it possible to use simple pin-type joints for the track rod joints 74 and 75, but it does reduce the amount of universal movement of which these joints must be capable. This reduction of the universal movement may, in some cases, make it practical to use a cheaper design of joint, and, in any case, it will reduce the amount of wear in the joint and make it easier to seal against the entrance of dirt and moisture and the loss of lubricant.

Figures 5 to 7 illustrate also the application of the invention to the drag link. The vehicle is provided with a conventional steering gear 80 (shown only in Figure 6) having a steering column 81 sloping up and back in the conventional position. The steering gear 80 itself, however, is twisted away from its normal position so that the axis 82 of the pitman arm shaft 83 intersects the axis 73 of the central steering arm pivot 69, the point of intersection 79 being called the apex of the drag link linkage.

The steering gear carries a pitman arm 84 fixed to the pitman arm shaft 83 and connected to the central steering arm 68 by a drag link 85. The ends of the drag link 85 are connected to the pitman arm 84 and the central steering lever or arm 68 by pin type joints 86 and 87, and these joints 86 and 87 are aligned so that their axes 88 and 89 pass through the point of intersection 79 of the pitman arm shaft axis 82 and the center steering arm pivot axis 73. Thus the four axes 73, 82, 88 and 89 of the pivots in the drag link linkage all pass through the apex 79 of the linkage, and the joints 86 and 87 at the ends of the drag link 85 can be pin type joints instead of being ball-and-socket joints as has hitherto been necessary.

The linkages shown in the drawings and described above are merely examples of how the invention may be carried out, and other ways in which the invention may be employed will occur immediately to the engineer. For example, the tie-rod linkage shown in Figures 1 and 2 can be used on a Dubonnet suspension as well as with a conventional axle. The track rod linkage shown in Figures 5 to 7 can be used with any form of suspension in which the king-pin supports move up and down with respect to the frame of the vehicle. The drag link linkage can be used with any suspension having a steering arm pivoted on the frame irrespective of whether or not it is at the center of the vehicle, as, for example, a Dubonnet suspension with a steering arm fixed to one of the steering knuckles and connected to the pitman arm of the steering gear by a drag link extending longitudinally of the vehicle. Also, the drag link linkage with a central steering arm can be arranged with the pitman arm extending transversely of the vehicle and connected by a longitudinally extending drag link to a transversely extending portion of the central steering arm. In view of these and many other possible variations of the linkages shown, the invention includes every steering linkage which falls within the terms of any one of the following claims.

I claim:

1. In an automobile, an axle, king pins carried by the ends of the axle, steering knuckles pivotally carried by said king pins, steering arms fixed to said steering knuckles, a tie-rod, and joints between the tie-rod and the steering arms, the axes of the king pins and the axes of the joints all four intersecting at a single point.

2. A steering arrangement as described in claim 1 in which the joints are "pin type" joints.

3. For an automobile, a steering knuckle, coaxial king pin bearings in said steering knuckle, a wheel spindle fixed to said steering knuckle at an oblique angle to the axis of said bearings, a steering arm fixed to said steering knuckle, and a hole in the steering arm adapted to receive the stem of a tie-rod joint, the axis of said hole lying in the same plane as the axis of said bearings.

4. In an automobile, a steering arm mounted on a pivot, a pitman arm, a steering gear having a pitman arm shaft to which the pitman arm is secured, and a link connecting said arms and secured thereto by joints, the four axes of the pivot, the pitman arm shaft, and the joints intersecting at a single point.

5. A steering linkage as described in claim 4 in which the axis of the steering arm pivot is fixed relative to the axis of the pitman arm shaft.

6. A steering linkage as described in claim 4 in which the axes of the steering arm pivot and the steering gear are fixed relative to the frame.

7. In an automobile having a frame and a pair of independently sprung wheels and steering knuckles movable vertically relative to the frame and steered by track rods extending laterally from a central steering arm mounted on a substantially vertical pivot on the frame, a steering gear mounted on the frame, the steering gear having a pitman arm and being mounted on the frame so that the axis about which the pitman arm swings and the axis of the pivot of the central steering arm pass through a common point of intersection, and a drag link connecting the pitman arm and the central steering arm and secured to them by joints whose axes pass through said point of intersection.

8. A steering linkage as described in claim 7 in which the drag link is approximately horizontal and extends part way across the automobile.

9. A steering linkage as described in claim 7 in which at least one of said joints is a "pin type" joint.

10. In an automobile, a frame, a steering knuckle mounted on a king pin vertically movable with respect to the frame, a steering arm fixed to the steering knuckle, a steering arm swingable about a pivot having its axis fixed with respect to the frame, and a rod connected to said steering arms by joints, the axes of said joints and the axes of said king pin and said steering arm pivot substantially intersecting at a single point.

11. In an automobile, a body, a wheel adapted to roll on the ground, a load transferring member fixed relative to the plane of the wheel and swingable with respect to the body about an approximately vertical pivot, a steering arm fixed to said member and swingable therewith about said pivot, a second steering arm mounted on and swingable about a second approximately vertical pivot, a steering arm actuated by a steering gear and swingable about a third pivot, a link connected to the first arm by a pivot and to the second arm by another pivot, and a second link connected to the second arm by a pivot and to the third arm by another pivot, the axes of the pivots between one link and the two arms connected by it and the axes of the pivots about which swing the two members carrying those two arms all four intersecting at one point.

12. An automobile as described in claim 11 in which said second arm is mounted on said second pivot together with a second load transferring member fixed relative to the plane of a second wheel and in which the axes of the pivots of the load transferring members and the axes of the pivots of the link joining the arms on said load transferring members are the four axes intersecting at one point.

13. An automobile as described in claim 11 in which the axis of the pivot of the second steering arm is fixed relative to the steering gear and intersects the axis of rotation of the third steering arm and the two axes of the two joints between said second and third steering arms and the link joining them, the intersection of the four axes being at a single point.

PAUL HEFTLER.